United States Patent Office 3,391,163
Patented July 2, 1968

3,391,163
10,5-(EPOXYMETHANO)-10,11-DIHYDRO-5H-DI-BENZO[a,d]CYCLOHEPTENE-11,13-DIONE
Thomas A. Dobson, St. Laurent, Quebec, and Martin A. Davis, Montreal, Quebec, Canada, assignors to American Home Products Corporation, New York, N.Y., a corporation of Delaware
No Drawing. Filed May 23, 1966, Ser. No. 551,937
1 Claim. (Cl. 260—343.2)

ABSTRACT OF THE DISCLOSURE

The compound 10,5-(epoxymethano)-10,11-dihydro-5H-dibenzo[a,d]cycloheptene-11,13-dione effective against helminthic parasites, and its preparation by the chromic acid oxidation of the corresponding 11-hydroxy compound.

---

This invention relates to a novel chemical compound and to intermediates used in its preparation. In particular this invention relates to 10,5-(epoxymethano)-10,11-dihydro-5H-dibenzo[a,d]cycloheptene - 11,13 - dione of the following Formula I:

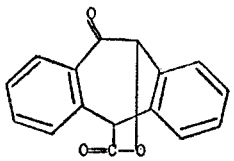

I

The compound of this invention possesses important biological properties and is valuable as a medicament. It possesses important antiparasitic activities which are demonstrated both in vitro and in vivo. It shows a high degree of kill against the horse strongyle parasite and is thus useful for the decontamination of premises or pastures infested with this organism or other members of the strongylidae family, for example hookworms, trichostrongylidae or metastrongylidae. For this purpose the compound may be formulated with a suitable inert vehicle, such as, for example, water. The resulting suspension may contain from 0.01 to 0.005 mole of the active ingredient per litre. The compound also possesses activity against *Syphacia obvelata* in mammals and may be used to combat pinworm infestations. For this purpose the compound may be administered orally to mammals in dosages ranging from 50 to 500 mg./kg.

The compound of this invention is prepared by treating an 11-hydroxy-10,5-(epoxymethano)-10,11 - dihydro-5H-dibenzo[a,d]cyclohepten-13-one with a suitable oxidizing agent, preferably chromic acid, to yield the desired 10,5-(epoxymethano)-10,11-dihydro-5H - dibenzo[a,d]cycloheptene-11,13-dione.

More specifically, the compound of this invention is prepared by the following method. Thus, a solution of an 11-hydroxy-10.5-(epoxymethano)-10,11-dihydro - 5H-dibenzo[a,d]cyclohepten-13-one of Formula II in an inert solvent, such as for example acetone, is treated at or below room temperature with a molar excess of an aqueous solution of chromic acid. Dilution of the mixture with water and solvent extraction of the mixture yields 10,5-(epoxymethano)-10,11-dihydro - 5H - dibenzo[a,d]cycloheptene-11,13-dione of Formula I.

The starting material for the compound of this invention, namely the 11-hydroxy-10,5-(epoxymethano)-10,11-dihydro-5H-dibenzo[a,d]cyclohepten-13-ones of Formula II may be prepared by the processes described in our co-pending U.S. patent application Ser. No. 539,640, filed Apr. 4, 1966, now Patent No. 3,361,767, issued Jan. 2, 1968. Briefly, these processes entail the treatment of 5H-dibenzo[a,d]cycloheptene-5-carboxamide, which may be prepared as described by M. A. Davis et al. in J. Med. Chem. 7, 88 (1964), with a mixture of silver acetate, iodine, acetic acid and water to give, after processing, 11-acetoxy-10,5-(epoxymethano)-10,11 - dihydro - 5H - dibenzo[a,d]cyclohepten-13-one which, upon saponification, yields the low melting geometrical isomer of 11-hydroxy-10,5-(epoxymethano)-10,11-dihydro - 5H - dibenzo[a,]cyclohepten-13-one of Formula II.

Alternatively, 5H-dibenzo[a,d]cycloheptene - 5 - carboxamide is treated with one molar proportion of bromine to give 10,11-dibromo - 5H - dibenzo[a,d]cycloheptene-5-carboxamide. This compound, when heated in the presence of ethanol or water, is converted to 11-bromo-10,5-(epoxymethano) - 10,11 - dihydro-5H-dibenzo[a,d]cyclohepten-13-one. The latter compound is treated with liquid ammonia to give 10,11-epoxy-10,11-dihydro-5H-dibenzo[a,d]cycloheptene-5-carboxamide. Hydration of this last-named compound with dilute sulphuric acid gives a mixture of the low and the high melting geometrical isomers of 11-hydroxy-10,5 - (epoxymethano)-10,11-dihydro-5H-dibenzo[a,d]cyclohepten-13-one of Formula II which may be separated from one another by fractional crystallization or directly used as such for the preparation of 10,5-(epoxymethano)-10,11-dihydro-5H-dibenzo[a,d]-cyclohepten-11,13-dione.

The following formulae and examples will illustrate this invention.

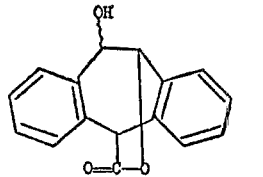

II

↓

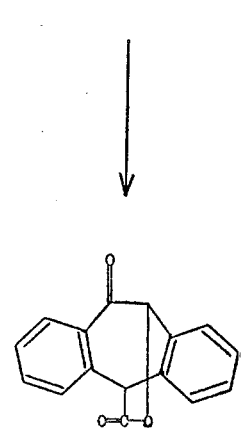

I

Example.—10.5-(epoxymethano)-10,11-dihydro-5H-dibenzo[a,d]cycloheptene-11,13-dione A solution of the low-melting geometrical isomer of 11 - hydroxy-10,5 - (epoxymethano)-10,11-dihydro-5H-dibenzo[a,d]cyclohepten-13-one (4.5 g., 0.018 mole) in acetone (60 ml.) is treated dropwise with 8 N chromic acid (4.5 ml.) until a permanent green colour appears. The mixture is filtered through Celite and the filtrate is poured into water. The product is isolated by extraction with dichloromethane followed by several extractions of the organic layer with water in order to remove the residual sulfuric acid. Drying, and evaporation of the solvent yields the title compound with M.P. 163–165° C., unchanged after recrystallization. Elemental analysis and NMR spectrography with peaks at 1.85, 2.50, 4.12 and 5.07τ confirm composition and structure.

In the same manner, the high-melting geometrical isomer of 11-hydroxy-10,5 - (epoxymethano)-10,11-dihydro-5H-dibenzo[a,d]cyclohepten - 13 - one yields the title compound with M.P. 160–165° C., identical with the compound obtained as above.

We claim:
1. 10,5 - (epoxymethano) - 10,11-dihydro-5H-dibenzo[a,d]cycloheptene-11,13-dione.

References Cited
UNITED STATES PATENTS
2,750,371   6/1956   Jubluskey _____ 260—343.2

OTHER REFERENCES
Mosher et al.: Jour. Amer. Chem. Soc., vol. 71 (1949), pp. 286–7.

Neidig et al.: Jour. Amer. Chem. Soc., vol. 72 (1950), pp. 4617–8.

JAMES A. PATTEN, *Primary Examiner.*